United States Patent [19]

Haun

[11] 3,841,511
[45] Oct. 15, 1974

[54] TRANSPORT SYSTEM AND APPARATUS THEREFOR

[76] Inventor: Jack B. Haun, 4348 Garden Dr., Salt Lake City, Utah 84117

[22] Filed: Nov. 19, 1973

[21] Appl. No.: 416,729

[52] U.S. Cl.......... 214/516, 280/415 B, 280/423 R, 296/35 A, 280/DIG. 8
[51] Int. Cl............................................. B62d 53/06
[58] Field of Search........ 214/516; 280/415 B, 418, 280/423 R, 423, 408, DIG. 8

[56] References Cited
UNITED STATES PATENTS

| | | | |
|---|---|---|---|
| 2,431,331 | 11/1947 | Johnson | 280/418 |
| 2,590,962 | 4/1952 | Gurton | 280/423 A X |
| 2,834,495 | 5/1958 | Norbom | 214/516 |
| 3,151,880 | 10/1964 | Black | 280/408 |
| 3,272,546 | 9/1966 | Cooley | 214/516 X |
| 3,718,346 | 2/1973 | Self et al. | 280/415 B |

Primary Examiner—Leo Friaglia

[57] ABSTRACT

A system wherein standardized, modular shipping components are convertible for use as trailers, semi-trailers or truck bodies. The modular shipping units are constructed to provide maximum use of available cubic space and have wheel carriage receiving units on the bottom thereof. Removable wheel carriages are provided to be attached to the modular shipping units and a trailer vehicle adapted to receive the modular shipping units is provided with means for moving the shipping onto and off of the frame of the vehicle to make a load carrying truck.

10 Claims, 10 Drawing Figures

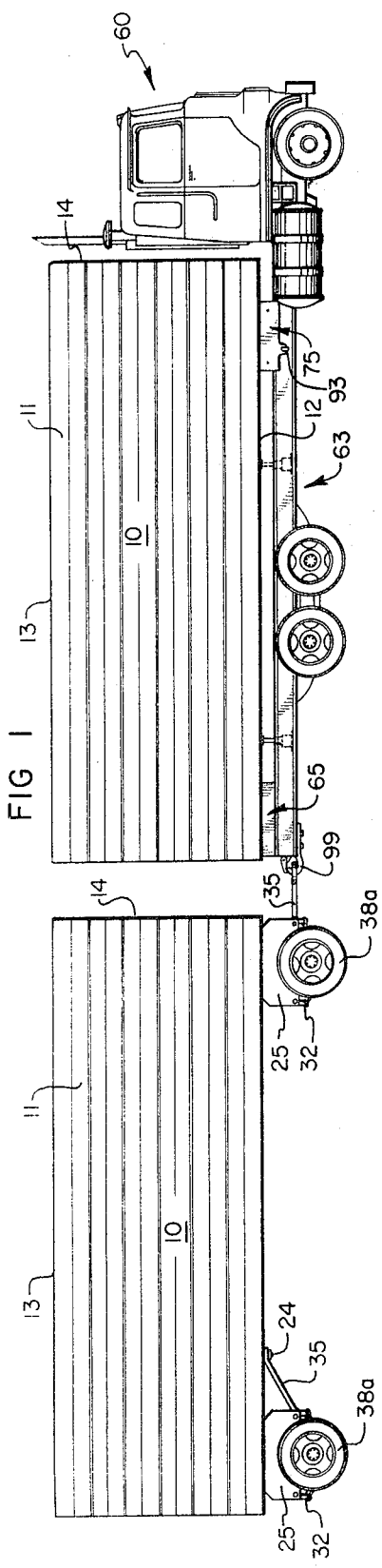
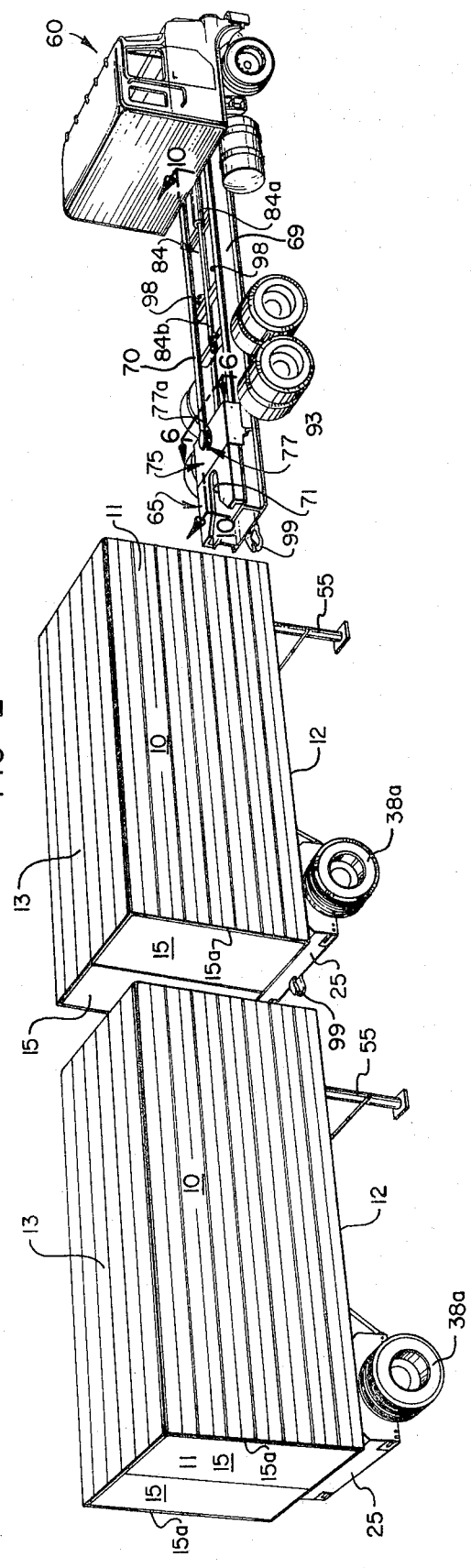

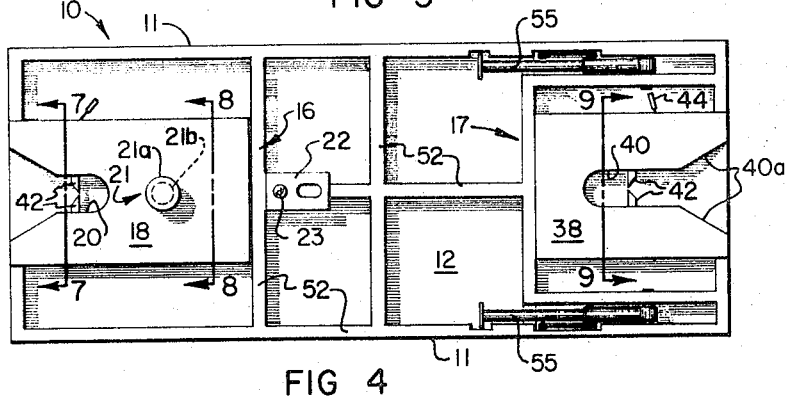
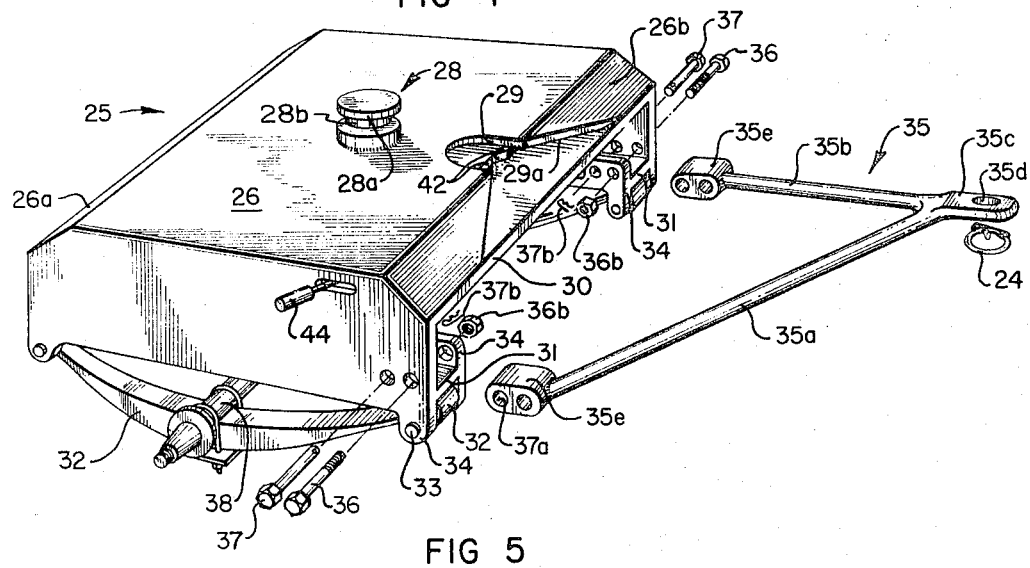
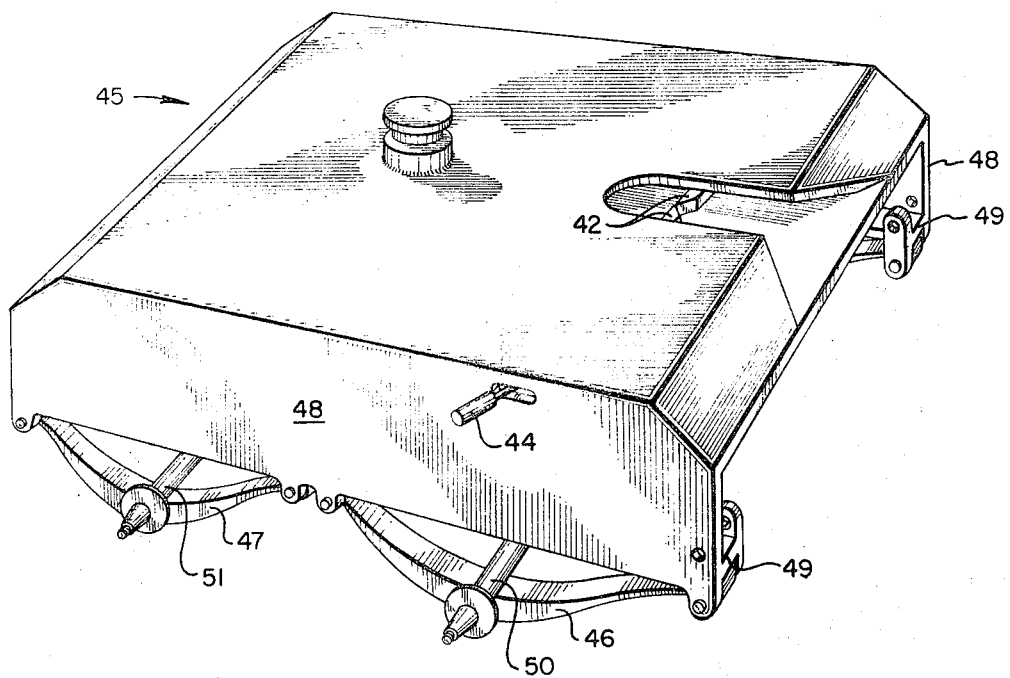

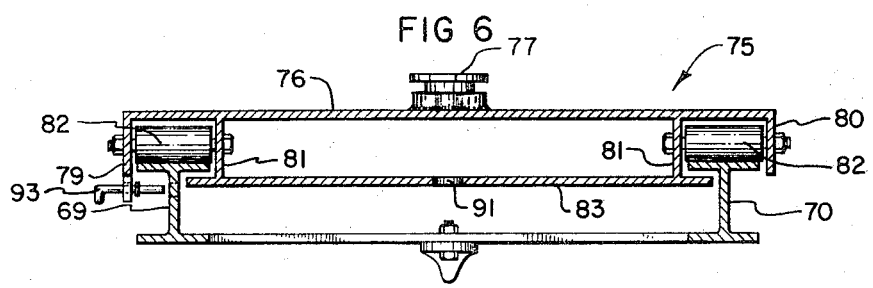
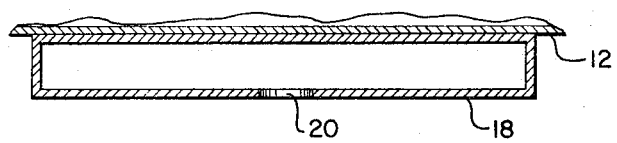
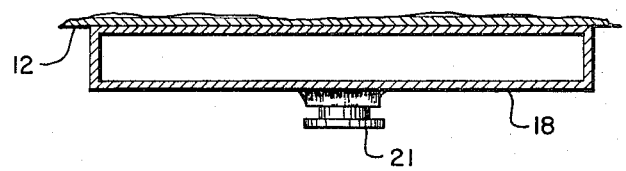
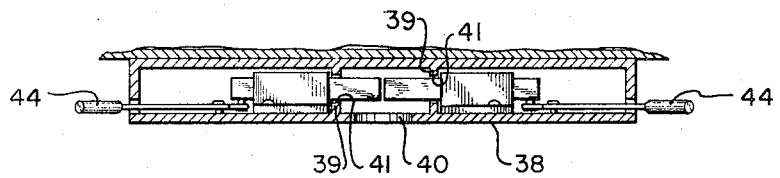
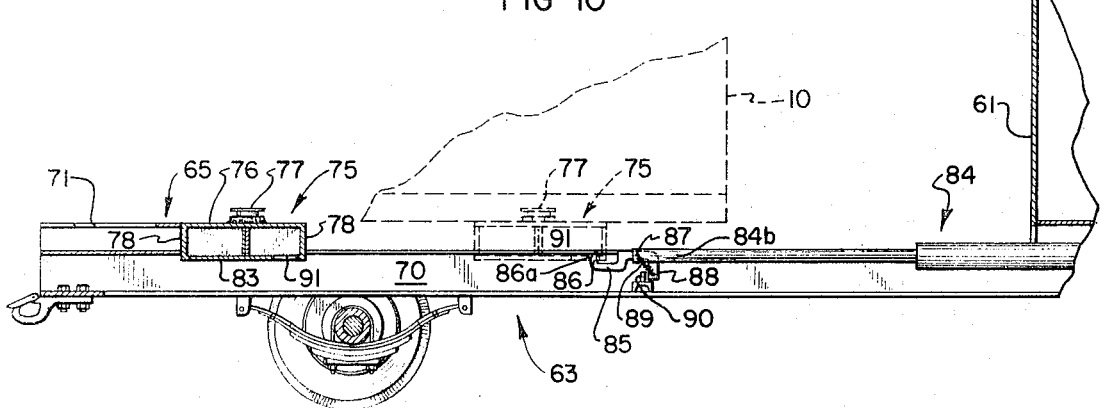

3,841,511

TRANSPORT SYSTEM AND APPARATUS THEREFOR

BRIEF DESCRIPTION OF THE INVENTION

1. Field of the Invention

This invention relates to systems and apparatus for transporting goods.

2. Prior Art

It has long been recognized desirable to provide standardized shipping containers that can be conveniently handled in shipping goods by rail, road, or ship. Thus, there have been a great many types of packages and containers proposed and the sizes of the containers proposed have varied from rather small to very large, being of such a size that they can be placed on railway flat cars for easy shipping or in some cases, small enough to be easily moved into and out of over-the-road vans. With the larger shipping containers, it is possible to make maximum use of the available space within them and they are rather easily moved using a hoist and sling arrangement onto a ship deck or onto a railway flat car. The same cargo compartment, in some instances, may be moved onto or off of a flat bed truck for over-the-highway transportation. So far as I am aware, there has not heretofore been developed a cargo unit that can be used not only by lifting it and placing it on flat surfaces such as may be found on ships, railway flat cars, or trucks with flat beds, but that also can be used as an over-the-road trailer, taking advantage of all available space permitted by law.

SUMMARY OF THE INVENTION

Principal objects of the present invention are to provide a transporting system that will permit efficient loading and handling of goods to be moved either by road, train, or ship, and that can be economically moved between carriers of different types.

Other objects are to provide transporting apparatus to be used in a transporting system that can be economically built using conventional equipment and that can be quickly and easily converted for use with carriers of different types.

Principal features of the invention include cargo carrying containers of a uniform size, suitable for use as a box of a truck or as a trailer or semi-trailer; carriage units that can be removably attached to undersurfaces of the compartment and that are used to anchor or pull the compartment; mating locking assemblies formed on the containers to receive and anchor the carriage units; and folding support legs attached to the container. The carriage unit may be attached to and slidable with respect to a truck bed or may be arranged to have one or more sets of spring suspended wheels thereon.

Other objects and features of the invention will be apparent from the following detailed description and claims, taken in conjunction with the accompanying drawings.

THE DRAWINGS

In the drawings:

FIG. 1 is a side elevation view of a truck and trailer assembly including the container of the present invention as load storing and carrying components thereof;

FIG. 2, a perspective view taken from above the assembly of FIG. 1, but with component parts thereof separated for clarity;

FIG. 3, a bottom plan view of a compartment of the invention;

FIG. 4, an enlarged perspective view taken from slightly above and at one front corner of a carriage unit, with attachment parts exploded out for clarity;

FIG. 5, a further enlarged perspective view of another embodiment of the carriage unit;

FIG. 6, a vertical section taken on the line 6—6 of FIG. 2;

FIG. 7, a vertical section, taken on the line 7—7 of FIG. 3;

FIG. 8, a fragmentary vertical section taken on the line 8—8 of FIG. 3;

FIG. 9, a similar view taken on line 9—9 of FIG. 3; and

FIG. 10, another similar view, taken on line 10—10 of FIG. 2.

DETAILED DESCRIPTION

Referring now to the drawings:

In the embodiment illustrated in FIGS. 1-4, 6 and 7, the container of the invention is shown generally at 10. As shown, the container is of generally box-like configuration, with spaced side walls 11, a bottom 12, a top 13, an end wall 14 interconnecting the top side walls and bottom at one end thereof, and swinging rear doors 15, each of which is hingedly connected at 15a to a side wall. As will become apparent, other body arrangements may be used.

The undersurface of each bottom, FIG. 3, has locking assemblies 16 and 17 thereon to mate with and secure carriage assemblies in place. Locking assembly 16 is located at the rear of the container, and centrally between the side walls. The locking assembly 16 includes a plate 18 that is spaced from the bottom 12 by a depending flange 19 and that has a slot 20 formed centrally from a rear edge thereof, and a king pin 21 projecting therefrom. King pin 21 is of standard construction and includes a post 21a projecting from the plate 18 and an encircling groove 21b near the end of post 21a. The slot 20 is flared outwardly from a location intermediate its length to the rearmost edge of plate 18. An anchor plate 22 (FIG. 3) is connected to the undersurface of bottom 12 and the plate 22 has a pintle 23 through which a snap hook 24 is adapted to be inserted, for purposes to be explained. A conventional king pin lock, as will be hereinafter described more in detail has jaws 42 extending across slot 20, between bottom 12 and plate 18. It will be apparent that other conventional locking means can be used in place of the pintle 23 and snap hook 24. It is only necessary that the end of drawbar 35 be anchored to the container.

A carriage unit 25, FIGS. 1, 2 and 4, is adapted to be coupled with the locking assembly 16. The carriage unit 25 includes a top plate 26 interconnecting spaced depending side flanges 27. The top plate 26 has an inclined rear edge 26a, an inclined front edge 26b, a king pin 28 comprising an upstanding post 28a extending from plate 26 and an encircling groove 28b near the end of post 28a.

The distance across the narrow portion of slot 20 is slightly larger than the diameter of post 21a. Similarly, a slot 29 in top plate 26 has a width that is slightly larger than the diameter of the post 28a. Slot 29 is flared outwardly at 29a, through the inclined front edge 26b, to a forward edge of the carriage unit 25.

A support plate 30 extends from the lowermost portion of inclined rear edge 26a to the lowermost portion of inclined front edge 26b and between the spaced depending side flanges to provide strength to the carriage unit 25.

Inturned webs 31 project from the spaced depending side flanges 27, below the support plate 30, and the ends of leaf springs 32 are journaled on shafts 33 extending between ears 34 on the ends of webs 31 and the side flanges 27.

A drawbar 35, FIG. 4, has spread arms 35a and 35b that intersect at a common extension 35c having a hole 35d therethrough. The hole 35d allows the end of the drawbar 35 to fit over pintle 23 so that the hook 24 can be inserted through a hole provided therefor through the pintle to lock the drawbar in place. The ends of arms 35a and 35b remote from the common extension 35c each have a journal housing 35e thereon, adapted to rotatably fit around a bolt 36 that is inserted through a side flange 27 and ear 34 carried by each web 31. Nuts 36b, turned onto the ends of bolts 36, hold them in place. Pins 37, inserted through the side flanges 27 and through lock holes 37a in the journal housings 35e, can be used to immobilize the drawbar with respect to bolt 36. This allows the drawbar to be set in a fixed position when it is used to roll the wheel carriage around. Snap pins 37b are inserted through the ends of pins 37 to hold them in place.

An axle shaft 38 extends across and is clamped to the springs 32 and wheels 38a. As the carriage unit is moved beneath the rear of bottom plate 18, the carriage unit is guided into position by engagement of posts 21a and 28a, respectively, with the slots 29 and 20 and by the inclined front edge 26b. Hole 35d is placed over pintle 23 and hook 24 is inserted through the pintle to hold the carriage unit to the container. The jaws 42 of the king pin lock extend into grooves 21b and 28b to secure the king pins within the slots 20 and 29 until the jaws are released. Since the carriage unit is anchored to the container at three aligned points, i.e., pintle 23, and pins 21 and 28, the carriage unit cannot pivot with respect to the container.

Locking assembly 17 is at the front end of bottom 12, and like locking assembly 16, is adapted to receive a carriage unit 25. Thus, locking assembly 17 is located centrally between the side walls 11 of the container and includes a plate 38 that is spaced from the underside of bottom 12 by flanges 39. A slot 40, corresponding to the slot 20 of locking assembly 16, but made longer, is provided to extend from a flared portion 40a at the leading edge of the plate. Slot 40, like slot 20, has a width that is slightly greater than the diameter of post 28a but that is less than the diameter of head 28b.

Aligned holes 41 are provided through the respective side flanges 39 and spring loaded jaws 42, forming part of a conventional fifth wheel king pin locking mechanism, are biased therethrough. In use, when a carriage unit 25 is pushed beneath the bottom 12 the pin 28 is guided into slot 40 such that head 28b is between the plate 38 and the bottom 12 and post 28a is within the slot. As post 28a is being moved fully into slot 40, jaws 42 are cammed apart and then are biased back into position, locking the post within the slot. A lever 44 is manually operated to open the pins so that the king pin post can be moved out of the slot, or to allow the container to be set directly down on the wheel carriage. Jaws 42 thus prevent movement of the pin 28 out of slot 40 while allowing the carriage to rotate beneath the container, with the plates 26 and 38 serving as bearing plates.

Inclined rear edge 26a of the carriage unit assists in guiding the pin 28 into position with respect to slot 40, and the drawbar 35 can be used to couple the carriage unit 25 at the front of the container 10 and the attached container, to a pulling unit.

As shown in FIG. 5, the carriage unit used can also be of a tandem wheel construction. In this arrangement, the carriage unit, shown generally at 45, is constructed in the same fashion as is the carriage unit 25, except that it is made longer in conventional tandem fashion for use with larger containers. A pair of aligned leaf spring assemblies 46, 47 are journaled between side flanges 48 and ears on webs 49 at each side of the carrier unit and parallel dual axles 50 and 51 extend across and are clamped to opposing spring assemblies. While the wheels are not shown mounted on the axles it is to be understood that they will be mounted on the ends thereof in conventional fashion. A drawbar 35, FIG. 4, is used to move unit 45 when it is not positioned under a container.

The bottom 12 of container 10 rests on a framework of steel beams 52 and the locking assemblies 16 and 17 are welded or otherwise affixed to the beams and are positioned such that only pin 21 extends below the beams and the side walls 11 of the container. The front and rear portions of the container 10 are respectively cut away at 53 and 54 to the extent necessary to allow the king pins 28 to move into the slots 20 and 40.

In practice, the containers 10, when used as shipping containers for railway flat cars or cargo carrying ships, will not have the carriage units 25 or 45 attached. If the carriage units are attached when the shipping containers arrive at the flat car or ship to be loaded, the carriage units are easily removed by use of a loading crane to slightly lift the assembled unit, removing hook 24 and the drawbar from pintle 23 and releasing the carriage unit 25 from locking unit 16. The carriage unit can be released from the locking assembly 17 simply by releasing jaws 42 annd then sliding the carriage unit forward or lifting the container from the carriage unit.

Conversely, when the containers 10 are to be removed from a railway flat car or a ship, the crane used to lift them can hold them in a position such that the carriage units can be readily rolled into position to then slide into locking position so that the hook 24 and jaws 42 will lock or to lower them directly onto the wheel carriages, while jaws 42 are in an open position.

If the containers 10 are to be stored in a lot, or other such area before being used for over highway transport, they will usually be arranged as shown in FIG. 2. As shown, one carriage unit 25 is fixed in position with respect to locking assembly 16, and legs 55 are pivoted from a stored position beneath the bottom 12 to a locked downwardly extending position beneath the container. The legs 55 are of conventional telescoping construction and preferably are hydraulically powered to be extended and retracted. The upper ends of the legs are pivotally connected at 56 to beams 52 and in their stored position, the legs are fully between the beams 52 so that they will not obstruct handling of the containers. When pivoted to their use position, braces 57 and 58 lock them in position and hydraulic cylinders extend and retract the legs, as desired, through couplings (not shown) to a conventional hydraulic pressure system (not shown). The pivoted legs and their construction are well known and will not be herein described in detail.

When the containers 10 are arranged as shown in FIG. 2, with a wheeled carriage unit 25, connected to locking assembly 16 at the rear of the container and with the legs 55 extended, the container is easily loaded onto the frame 59 of a truck, shown generally at 60 in FIGS. 1 and 2.

Truck 60 includes the usual truck cab and motor cowling 61, steering wheels 62, chassis 63 and rear, load carrying wheels 64. A fixed carriage 65 is mounted at the rear of the chassis to receive the pin 21 of the locking assembly 16 at the rear of a container 10. The fixed carriage comprises a top plate 66 interconnecting depending side plates 67 and 68 that rest on spaced apart parallel chassis members 69 and 70, respectively. The top plate has a slot 71 therein that is shaped like slots 20, 29 and 40. A plate 72 extends between the side plates 67 and 68, beneath and a spaced distance from the top plate 66 to strengthen the fixed carriage.

A movable carriage 75 is positioned between the vehicle cab and the fixed carriage 65 and is mounted to reciprocate along the chassis members 69 and 70. As shown, the movable carriage 75 includes a top plate 76, having a standard fifth wheel king pin 77, projecting upwardly from the center thereof, depending end plates 78 that project downwardly from opposite sides 79 and 80, and spaced intermediate plates 81 that extend downwardly from plates 76 adjacent to and between the chassis members 69 and 70. Rollers 82 are journaled between the adjacent end plates and intermediate plates and rest on the chassis members 69 and 70, whereby the movable carriage is readily rolled along the chassis members. The number and size of rollers 82 provided to roll on each chassis member 69 and 70 is dependent on the load to be carried, but at least two such spaced apart rollers are generally provided for each such chassis member to insure proper weight distribution and smooth rolling. Additional cross bracing, such as provided by the plate 83 and any other necessary diagonal bracing (not shown) can be used to reinforce the movable carriage, as needed.

A hydraulic ram 84, operated through a hydraulic system of the truck 60 is mounted to have its cylinder 84a fixed to the truck chassis 63 between members 67 and 70, immediately behind the cowling 61, and such that the cylinder rod 84b can be extended towards and retracted from the rear of the chassis 63. A grab hook 85 is provided on the end of the cylinder rod and the grab hook is mounted to pivot into and out of coupling engagement with the plate 83 of the movable carriage 75.

The overall length of the ram 84 aand grab hook 85, when the cylinder rod is fully retracted, does not exceed the distance from the rear of the cowling 61 to the coupling of the grab hook and the plate 83. Thus, as will become apparent, the hook can be used to move a container 10 fully onto and off of the chassis 63.

While other forms of grab hook can be used, hook 85 preferably includes a generally U-shaped end 86 that is pivotally connected at 87 to the free, bifurcated end of cylinder rod 84b. A lever 88, formed as a continuation of the end 86, extends downwardly with respect to the cylinder rod and a spring 89 connected between the end of the cylinder rod and the lever 88 to bias the end 86 upwardly until it engages a stop 90 on the bifurcated end. The leading portion of the end 86 has an inclined cam surface 86a thereon so that as the end hits plate 83 the end 86 will be pivoted downwardly to allow the end to pass under the plate until the surface 86a is biased by spring 89 into a hole 91 provided therefore through plate 83.

A stop 90, fixed to the chassis is positioned to be engaged by lever 88 just before the cylinder rod 84b is fully extended, such that continued extension of the rod will pivot the end 86 downwardly.

In loading a container arranged as is shown in FIG. 2 onto the frame 59 of truck 60, the legs on the trailer are extended to place the container 10 at a proper height, and the truck is aligned with the trailer and then is backed thereunder to move post 77a of king pin 77 into slot 40 of the front locking assembly 17 on a container 10. The jaws 42 automatically lock the post 77a in place and the jaws 42 prevent withdrawal of the pin from the slot. A retractable lock pin 93, FIG. 6, extends through the chassis to prevent movement of carriage 75 while pin 77 is being inserted and locked into slot 40 and as the landing legs are retracted and pivoted.

Lock pin 93 is retracted down out of chassis member 69 before backing of the truck continues and the movable carriage 75 rolls on the chassis members 69 and 70 towards the vehicle cowling. Just before the rear wheels of the truck reach the legs 55 on the container, or earlier, if desired, the legs are retracted and pivoted to their storage position. Thereafter, the truck is again backed until the rear of the truck frame and fixed carriage 65 are at the plate 22. The hydraulic ram 84 is actuated to extend the cylinder rod 84b into engagement with plate 83 of the movable carriage 75 as previously described. The wheeled carriage unit, which may be unit 25 or unit 45, is then removed from the rear of container 10 by removing hook 24 and connecting the drawbar to a pintle hook 99 on the rear of the chassis. Ram 84 is again actuated to retract the cylinder rod 84b and to pull the container 10 to a fully loaded position on the truck while the carriage unit is held in place. In the fully loaded position, the end wall 14 of the container is adjacent to cowling 61, pin 77 is locked to slot 40, the movable carriage 75 is secured by the hydraulic ram 84, and the pin 21 of the locking assembly 16 at the rear of container 10 is moved and locked into slot 71 of fixed carriage 65. If desired, a standard fifth wheel king pin lock (not shown) can be used to automatically lock pin 21 in slot 71 and to assist the ram 84 in holding the container in place.

In unloading the container 10 from the vehicle, a reverse operation is followed. In this operation, any lock provided for slot 71 is released. Thereafter, ram 84 is actuated to extend the cylinder rod 84b and to push the movable carriage 75 and container locked thereto by pins 42 partially off the rear of the truck. A wheel carriage unit 25 is then attached to the locking assembly 16, in the manner previously described, and the ram 84 is again actuated to fully extend the cylinder rod. As has been explained, when the cylinder rod is fully extended the lever 88 engages stop 90 to pivot end 86 downwardly, thereby allowing the plate 83 to be released from the hook 85. The legs 55 are pivoted to their lowered support position and are locked in place and are extended so that the truck can then be driven from beneath the container.

It will be apparent that while it is desirable to be able to load the containers 10 onto a vehicle, as heretofore described, without the use of a crane, they can be loaded directly onto the vehicle through use of a crane. In this loading procedure the container is merely supported from above at a desired height, and the truck is backed therebeneath such that the couplings between pin 77 and slot 20, ram 84 and the plate 83 and pin 21 and slot 71 can be made.

If necessary, because of the span between the fixed carriage 65 and the movable carriage 75, when the movable carriage is moved fully forward on the truck, support jacks 98 can be fixed to the chassis 63 intermediate the length of the chassis. The jacks, when extended, engage the framework on the bottom of the container to provide intermediate support between the truck frame 63 and the bottom of the container 12.

The system of the invention is very versatile in that it provides shipping containers that can be conveniently handled by ship, rail, or land vehicle. The container can be readily carried on a truck bed or can be made into semi trailer or a towable trailer that can be coupled to a towing vehicle through the drawbar 35 and the ordinary pintle hook 99 on the vehicle. Naturally, as many of the trailers can be towed as local laws will permit.

Although preferred forms of my invention have been herein disclosed, it is to be understood that the present disclosure is by way of example and that variations are possible without departing from the subject matter coming within the scope of the following claims, which subject matter I regard as my invention.

I claim:

1. Apparatus for transporting materials comprising
a modular shipping container having a bottom, spaced side walls, spaced front and rear end walls interconnecting the bottom and the side walls at opposite ends thereof, a top interconnecting the side and end walls and a door providing access to the interior of the container through a wall thereof;

a rear locking assembly on the undersurface of the bottom at the end thereof adjacent the rear wall, said rear locking assembly comprising a plate fixed to and spaced from the bottom, a slot formed in the plate and extending from the edge of the plate at the rear of the bottom towards the center of the plate along the centerline of the bottom, and a king pin comprising a post extending downwardly from the plate on the centerline of the bottom, said pin being positioned forwardly of said slot; and a front locking assembly on the undersurface of the bottom at the end thereof adjacent the front wall, said front locking assembly comprising a plate fixed to and spaced from the bottom, a slot formed in the plate extending from the edge of the plate at the front of the bottom towards the center of the plate, and lock means arranged to extend into the slot to secure a king pin therein.

2. Apparatus for transporting materials as in claim 1, wherein
the bottom of the container has a structural framework thereon and only the king pin of the rear locking assembly projects from the bottom beyond the structural framework.

3. Apparatus for transporting materials as in claim 1, further including
a carriage unit adapted to be coupled to said locking assemblies, said carriage unit including a plate having a leading edge, a rear edge and a pair of side edges, a king pin extending upwardly from the plate and having an encircling groove thereon a spaced distance from the plate, and a slot extending from the leading edge into the plate, with the centerline of said slot aligned with a central axis of the pin.

4. Apparatus for transporting materials as in claim 3, wherein
the carriage unit has a frame supporting the plate on the side opposite to the pin projecting from the plate, axle means connected to the frame and extending therebeneath to beyond the side edges of the plate, and wheels mounted on ends of said axle means at opposite sides of the carriage unit.

5. Apparatus for transporting materials as in claim 4, wherein
the axle means comprises a pair of spaced apart parallel axles.

6. Apparatus for transporting materials as in claim 4, wherein
the carriage unit has a drawbar pivotally connected to the frame to project from beneath the leading edge of the plate, and means for releasably locking said drawbar in selected pivoted positions.

7. Apparatus for transporting materials as in claim 6, further including
means for releasably connecting the end of the drawbar projecting from beneath the leading edge of the plate to the bottom of the container.

8. Apparatus for transporting materials as in claim 7, further including
a pair of extensible legs; and
means mounting said legs to project downwardly from said bottom at the intersection of the bottom and the front wall.

9. Apparatus for transporting materials as in claim 1, further including
a vehicle load carrying frame;
a fixed carriage unit at the rear of said frame, said fixed carriage unit including a plate having a leading edge and a rear edge interconnected by side edges, and a slot formed in the plate and extending from the rear edge centrally of the plate;
a movable carriage unit having a top plate with a leading edge, a rear edge and side edges;
means mounting the movable carriage unit to reciprocate on the vehicle frame, towards and away from the fixed carriage unit, and a king pin projecting upwardly from the top plate and having an encircling groove formed thereon a spaced distance from the top plate; and
power means for moving said movable carriage unit between a position intermediate its position against the fixed carriage unit and its maximum travel position away from the fixed carriage unit and the maximum travel position.

10. Apparatus for transporting materials as in claim 9, wherein
the power means comprises a hydraulic cylinder fixed with respect to the vehicle frame and a rod projecting from the cylinder and having a hook on a projecting end thereof and means for releasing the hook from the movable carriage unit when the rod is fully extended.

* * * * *